United States Patent

Vogelsang

[15] 3,659,201

[45] Apr. 25, 1972

[54] APPARATUS FOR MEASURING THE MUZZLE VELOCITY OF A PROJECTILE

[72] Inventor: Remo Joseph Vogelsang, Sudbury, Mass.

[73] Assignee: Werkzeugmaschinenfabrik Oerlikon-Buhrle A.G., Zurich, Switzerland

[22] Filed: Aug. 5, 1970

[21] Appl. No.: 61,355

[30] Foreign Application Priority Data

Aug. 12, 1969 Switzerland ............................12234/69

[52] U.S. Cl. ..............................................324/179, 73/167
[51] Int. Cl. ...........................................................G01p 3/66
[58] Field of Search ........................................324/178–180; 73/167; 346/38

[56] References Cited

FOREIGN PATENTS OR APPLICATIONS 965,077  7/1964  Great Britain.........................324/179

Primary Examiner—Michael J. Lynch
Attorney—Wenderoth, Lind & Ponack

[57] ABSTRACT

Apparatus for measuring the muzzle velocity of a projectile has a measuring system at the muzzle of the gun barrel. The measuring system has two relatively spaced coils through which the projectile passes for inducing two signal pulses. Means are provided for compensating for changes in the distance between the two coils due to variations of temperature including a temperature-dependent resistor and wherein the thermoelectric voltage measured across said resistor is used as a compensating voltage in an electronic compensating circuit. The electronic compensating circuit has a phase-inverting stage to which the signal pulses are to be applied, wherein the output of the phase-inverting stage is connected to the input of a modified monostable multivibrator.

4 Claims, 4 Drawing Figures

Patented April 25, 1972

3,659,201

REMO JOSEPH VOGELSAND, Inventor

By Wenderoth, Lind & Ponack

Attorneys

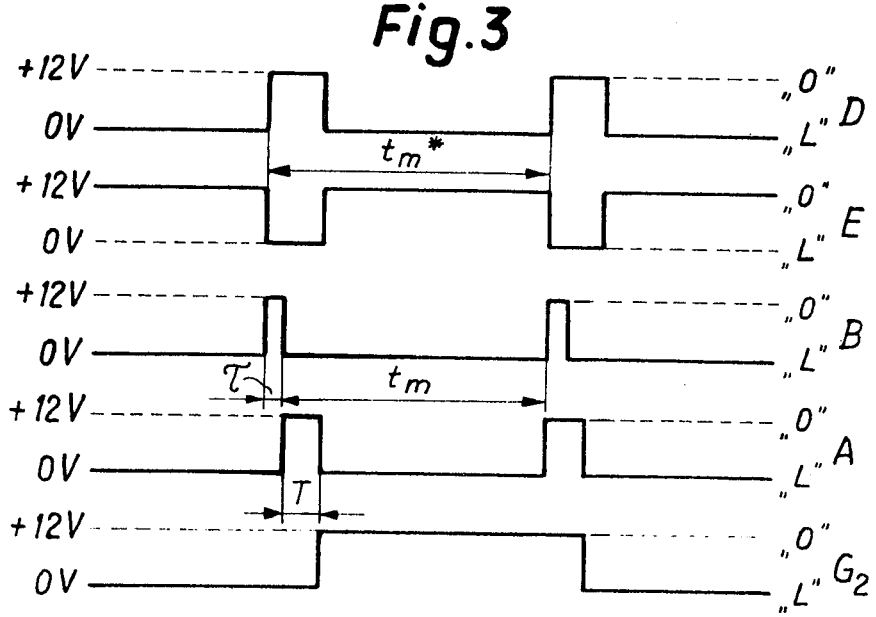
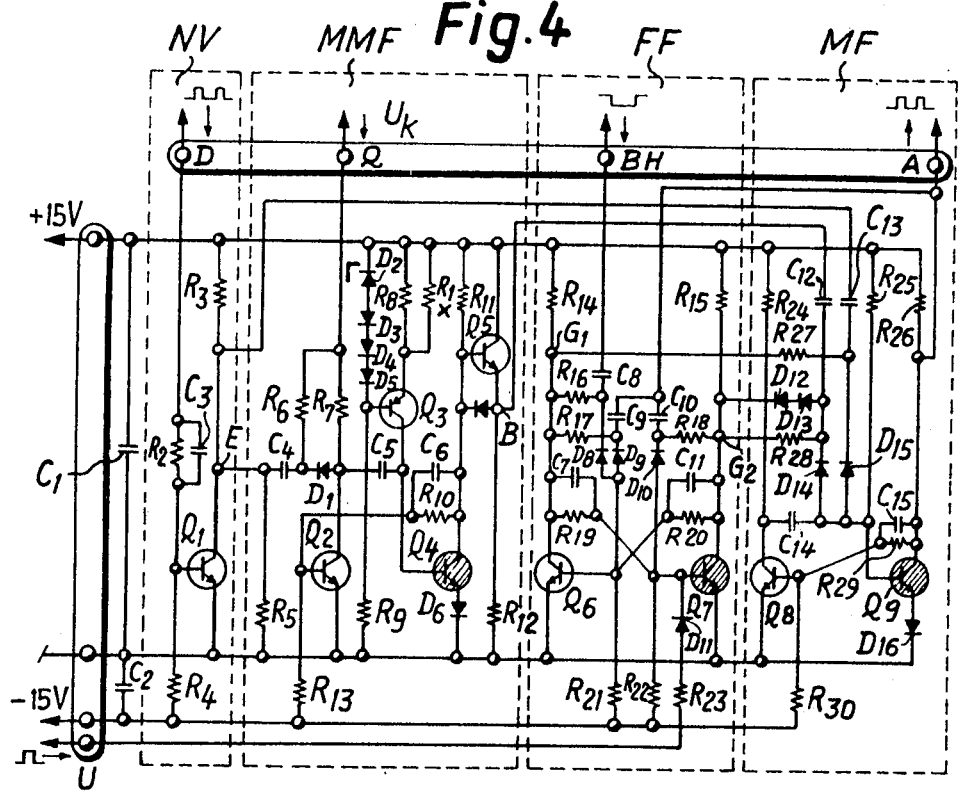

APPARATUS FOR MEASURING THE MUZZLE VELOCITY OF A PROJECTILE

The invention relates to apparatus of the kind for measuring the muzzle velocity of a projectile, comprising a measuring system at the muzzle of the barrel of a gun, in the form of two relatively spaced coils through which the projectile passes and in each of which the passage of the projectile induces a signal pulse.

In a conventional apparatus of this kind the coils are mounted on rods which are themselves attached to the muzzle and project beyond the end of the barrel. The barrel heated by the hot powder gases and the flash that emerges from the muzzle cause the temperature of the rods and coils of the measuring system to fluctuate very considerably. Temperature differences exceeding 500° C. are quite normal during ordinary firing and have been found to result in changes in length of the distance between the two coils over which the projectile is timed in the order of nearly 1 percent. Since the measurement of the muzzle velocity of the projectile is based on the assumption that the length of this distance remains strictly constant, any variation of this length falsifies the results obtained by such equipment.

It is the object of the present invention to eliminate this defect. According to the invention apparatus of the above kind comprises means for compensating for the variation of the spacing of the two measuring coils caused by temperature effects.

According to the present invention there is provided apparatus for measuring the muzzle velocity of a projectile comprising a measuring system at the muzzle of a gun barrel in the form of two relatively spaced coils through which the projectile passes and in each of which the passage of the projectile induces a signal pulse, and comprising means for compensating for changes in the distance between the two coils, due to variations of temperature.

The invention will be hereinafter more particularly described with reference to embodiments shown in FIGS. 1 to 4 of the accompanying drawings in which:

FIG. 3 illustrates the nature of the signal at characteristic points of the circuitry, and FIG. 4 is the detailed circuitry of the compensating means.

Figure 1:
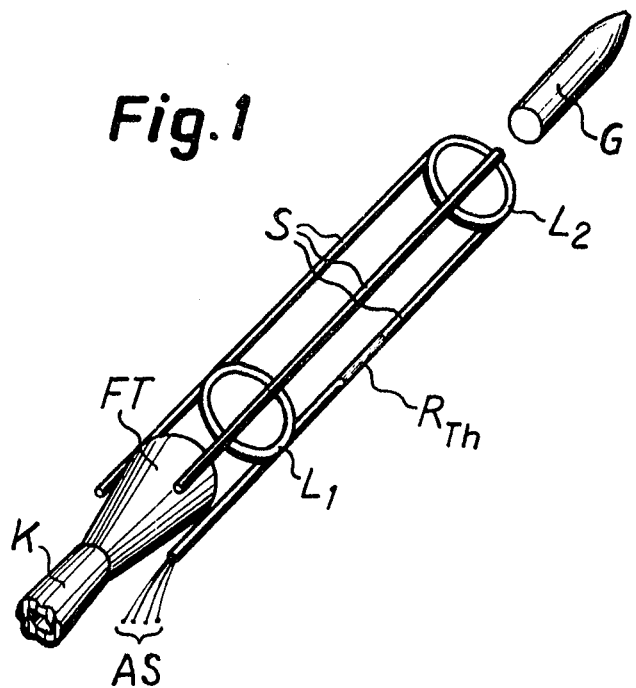
FIG. 1 is the general arrangement of the measuring system at the muzzle of a gun.

As shown in FIG. 1, three rods S are rigidly attached to the flash suppressor FT on the muzzle of a gun barrel K. Near each of their ends the rods carry a measuring coil $L_1$, $L_2$ consisting of wire wound rings, so mounted that the projectile G leaving the barrel must travel through both rings. One of the three rods S also carries a temperature-responsive resistor $R_{Th}$ which serves as a temperature sensor. Electrical connections AS for the coils $L_1$ and $L_2$ and for the variable resistor $R_{Th}$ are located inside the three rods.

Figure 2:
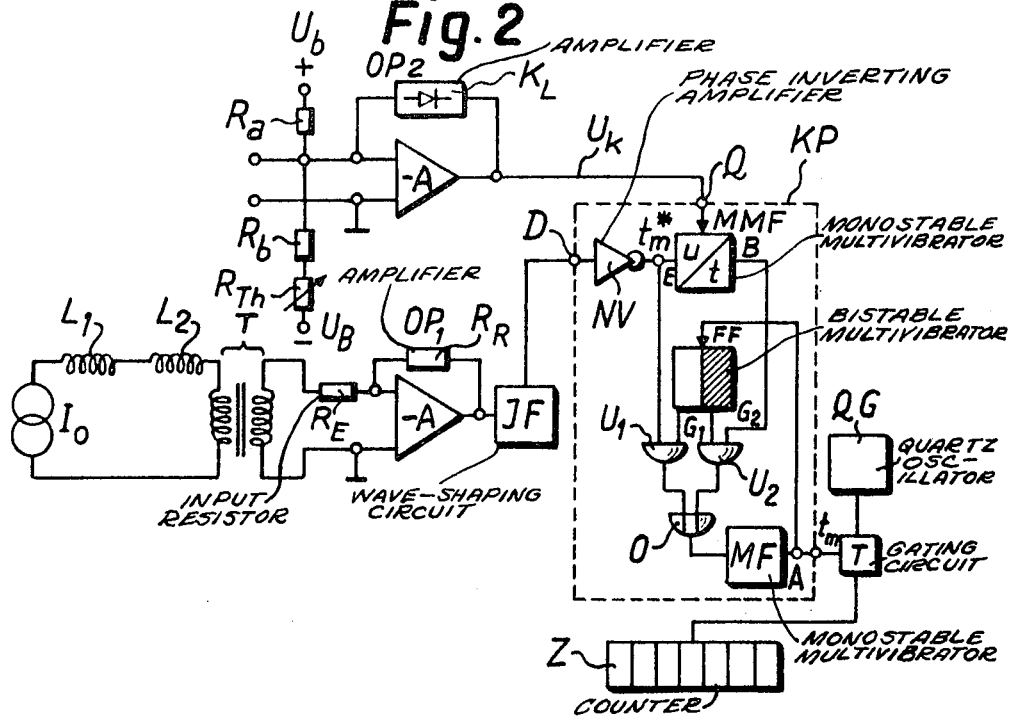
FIG. 2 is the general layout of a circuit for measuring the muzzle velocity of a projectile, including compensating means.

As will be understood from FIG. 2 the two measuring coils $L_1$ and $L_2$ are in series and the primary winding of a transformer T is connected in series with both coils $L_1$ and $L_2$. A source $I_o$ of stabilized DC feeds the circuit comprising the two coils $L_1$, $L_2$ and the primary winding of the transformer T. The two ends of the secondary winding of the transformer T are connected to the two inputs of an operational amplifier $OP_1$ which has the form of a differential amplifier. One input of the amplifier and hence one end of the secondary winding of the transformer T is grounded, the other input of the amplifier being connected via an input resistor $R_E$ to the other end of the secondary winding of the transformer T as well as via a feedback resistor $R_R$ to the amplifier output. The ratio of the feedback resistor $R_R$ to the input resistor $R_E$ determines the signal gain provided by the amplifier in a manner that is well understood. The output signal of the operational amplifier $OP_1$ is applied to a wave-shaping circuit IF which converts the input signal into a square wave signal. Such wave-shaping circuits are sometimes referred to in the literature as Schmitt triggers. The square wave signal delivered by the wave-shaping circuit IF is applied to a phase inverting amplifier NV which inverts the polarity of the square wave. The square wave pulse that has been thus treated is then fed to a modified monostable multivibrator MMF which will be later more fully described. The modified monostable multivibrator MMF is also supplied with a compensating voltage $U_K$ which is proportional to the temperature at the measuring system. The effect of the compensating voltage $U_K$ is, according to its magnitude, to reduce the time intervals between the pulse signals generated by the monostable multivibrator MMF. The input E of the modified monostable multivibrator MMF is also connected to one input of an AND-gate $U_1$. The other input of the AND-gate $U_1$ is connected to the output $G_1$ of a bistable multivibrator FF. The output B of the modified monostable multivibrator MMF is taken to one input of a second AND-gate $U_2$. The other input of this AND-gate $U_2$ is connected to the other output $G_2$ of the bistable multivibrator FF. The bistable multivibrator FF is so designed that when the circuit becomes operative the right hand output $G_2$ delivers a digital "L" signal. The outputs of the two AND-gates $U_1$ and $U_2$ are taken to an OR-gate O, the output of the latter being applied to the input of a monostable multivibrator MF. The output A of the monostable multivibrator MF is connected, on the one hand, to the symmetrical input of the bistable multivibrator FF and, on the other hand, to the input of a gating circuit T which is interposed between a quartz oscillator QG and an electronic counter Z.

For obtaining the compensating voltage $U_K$ a second operational amplifier $OP_2$ is provided, which likewise has the form of a differential amplifier. One input of the differential amplifier is grounded, whereas the other input is connected to a potential divider consisting of resistors $R_a$, $R_b$ and a temperature-responsive resistor $R_{Th}$. The potential divider $R_a$, $R_b$, $R_{Th}$ is interposed between the two poles of an operating voltage $U_B$. A characteristic network KL which lies between one input and the output of the operational amplifier $OP_2$ comprises diodes and permits the existing non-linear relationship between the existing temperature at the measuring system and its variation in length to be taken into consideration. The output of the operational amplifier $OP_2$ which delivers the corresponding variable compensating voltage $U_K$ is connected to the modified monostable multivibrator MMF.

With reference to the signal graph in FIG. 3 the manner in which the above described circuit in FIG. 2 functions will now be described:

The projectile generates a signal when passing both through the first coil $L_1$ and through the second coil $L_2$, both signals being transmitted by the transformer T to the operational amplifier $OP_1$. After amplification the signal is taken to the wave-shaping circuit IF which converts the input signals into square wave pulses. FIG. 3 shows the output signal of the wave-shaping circuit IF as it will appear at point D in the circuit diagram. The time interval between the rising flanks of the two consecutive pulses is equal to $t_m{}^*$ and depends upon the muzzle velocity of the projectile and the distance between the two coils. Since the latter is a function of temperature this time interval $t_m{}^*$ requires a correction for temperature.

For this purpose the signal at point D is first inverted. The inverted signal obtained at point E (FIG. 3) goes to one input of the modified monostable multivibrator MMF. If the digital signal "O" is assumed to be represented by the positive voltage of +12V and the digital signal "L" by the voltage OV, then the first "O"-"L" flank appearing at point E causes the modified monostable multivibrator MMF to change state and the "O" signal to appear in its output. At the end of a time interval $\tau$ that depends upon the compensating input voltage $U_K$ the multivibrator MMF returns to its stable state in which the "L" signal appears in its output. The signal at point B is shown as a function of time in FIG. 3. The appearance of the "L" signal at point B also satisfies the AND condition for opening the AND-gate $U_2$ since the bistable multivibrator FF first likewise generates an "L" signal in its output $G_2$. Hence the output of the AND-gate $U_2$ is an "L" signal which is applied by the OR-gate O to the input of the monostable multivibrator MF which therefore changes from its stable state in which an "L" signal appears in its output to its quasistable state in which it delivers an "O" signal for a given period of time T. At the end of the time T the monostable multivibrator MF returns to its stable state. The "L" signal which then appears in its output causes the bistable multivibrator FF to change over from one to the other stable state in which the "L" signal appears in the output $G_1$ and the "O" signal in the output $G_2$. Since the $G_1$ output is an "L" signal one of the AND conditions for opening the AND-gate $U_1$ is satisfied. The second AND condition will be satisfied when the inverted measured signal at point E changes from "O" to "L" as the projectile passes through the second coil $L_2$ of the measuring system. When this is the case the "L" signal also appears in the output of the AND-gate $U_1$. This output signal is transferred by the OR-gate to the input of the monostable multivibrator MF which changes from its stable state in which its output is an "L" signal to its quasi-stable state in which an "O" signal appears in its output for the given period of time T. At the end of the time interval T the "L" signal reappears in the output A and changes the bistable multivibrator FF back again, so that the signal in the output $G_2$ is "L" and the original position of the compensating circuit restored.

The pulses appearing at A which follow at a time interval $t_m$ that has been corrected according to the temperature at the measuring system open and close the gate T and thus allow a given number of pulses from the quartz oscillator QG to be fed to the counter Z, this number being a direct digital measure of the muzzle velocity of the projectile.

Changes in the distance traversed between the two coils are compensated in the measurement of the velocity because according to the existing temperature which causes the distance to change the rising flank of the first measuring pulse is shifted by a time correction $\tau$.

The compensating circuit KP which is contained within the chain line box in FIG. 2 is shown in detail in FIG. 4. This circuit consists of a phase-inverting stage NV, a modified monostable multivibrator MMF, a bistable multivibrator FF, a monostable multivibrator MF and gate circuits $U_1$, $U_2$, O between the bistable multivibrator FF and the monostable multivibrator MF.

The compensating network is constructed and functions as follows:

Between ground and the two poles of the operating voltage of $\pm 15V$ are two smoothing capacitors $C_1$, $C_2$ which remove any ripples from the operating voltage. The phase inverting stage NV comprises an npn-junction transistor $Q_1$ of which the base is connected through a resistor $R_4$ to $-15V$ and through another resistor $R_2$ shunted by a capacitor $C_3$ to the input terminal D. The shaped square wave pulses are applied to this terminal D. The emitter of the transistor $Q_1$ is grounded and the collector is connected through a resistor $R_3$ to the $+15V$ and a resistor $R_5$ to the $-15V$ supply. The transistor $Q_1$ normally blocks but becomes conductive when a positive-going pulse appears at its base and causes the collector voltage of the transistor $Q_1$ at point E to change to ground potential abruptly. This negative potential change is differentiated in an RC member comprising a resistor $R_6$ and a capacitor $C_4$ and is then applied via a diode $D_1$ and a capacitor $C_5$ to the base of an npn-junction transistor $Q_4$ in the modified monostable multivibrator MMF. This transistor $Q_4$ is normally conductive. This is assured by a pnp-junction transistor $Q_3$ of which the collector is connected to the base of transistor $Q_4$ to which it applies a stabilized control voltage. The emitter of the transistor $Q_3$ is connected through two resistors $R_1$, $R_8$ in parallel to the $+15V$ supply, whereas the base is connected firstly through a resistor $R_9$ to ground and secondly through diodes $D_3$, $D_4$, $D_5$ and a zener diode $D_2$ to the $+15V$ supply. The zener diode $D_2$ stabilizes the controlling potential applied to the base of the transistor $Q_5$, whereas the diodes $D_3$, $D_4$, $D_5$ compensate the effect of temperature variation of the base-emitter circuit of transistor $Q_3$. The emitter of the normally conductive transistor $Q_4$ is connected through a diode $D_6$ to ground and the collector through a resistor $R_{11}$ to the $+15V$ supply as well as through a resistor $R_{10}$ shunted by a capacitor $C_6$ to the base of an npn-junction transistor $Q_2$. The base of transistor $Q_2$ is at the same time connected through a resistor $R_{13}$ to the $-15V$ supply. The emitter of the transistor $Q_2$ is grounded and the collector is connected to the junction between the diode $D_1$ and the capacitor $C_5$, said junction being at the same time in communication through a resistor $R_7$ with the input terminal Q for the correcting voltage $U_K$. The input terminal Q is also connected through a resistor $R_6$ to the junction between the diode $D_1$ and the capacitor $C_4$.

The modified monostable multivibrator MMF functions as follows:

A negative-going pulse appearing at point E is differentiated and the differentiated signal is applied to the base of transistor $Q_4$ rendering it non-conducting. The voltage at the base of transistor $Q_4$ therefore abruptly becomes more negative by the magnitude of the compensating voltage $U_K$ less the saturation voltage of the transistor $Q_2$. The capacitor $C_5$ then becomes charged by the stabilized collector current of the transistor $Q_3$ so that at the end of a given time interval $\tau$ the transistor $Q_4$ will become conductive again and change the modified monostable multivibrator MMF back to its stable state. The time during which the transistor $Q_4$ is non-conductive and hence the duration of the pulse in the output is proportional exclusively to the magnitude of the compensating voltage $U_K$, in view of the constancy of the current supplied by the transistor $Q_3$.

An emitter follower comprising an npn-junction transistor $Q_5$ of which the base is connected to the collector of the transistor $Q_4$, said collector being biased by the $+15V$, whereas the emitter is connected through a resistor $R_{12}$ to ground and through a diode $D_7$ to the collector of the transistor $Q_4$, ensures that the output B is insensitive to load variations.

The input E and the output B of the modified monostable multivibrator MMF are connected by capacitors $C_{13}$ respectively $C_{12}$ and diodes $D_{15}$ respectively $D_{14}$ to the base of an npn-junction transistor $Q_9$ belonging to the monostable multivibrator MF. A resistor $R_{27}$ connects the junction between capacitor $C_{13}$ and diode $D_{15}$ to the left-hand output $G_1$ of the bistable multivibrator FF. Similarly a resistor $R_{28}$ connects the junction between capacitor $C_{12}$ and diode $D_{14}$ to the right-hand output $G_2$ of the bistable multivibrator FF. The components $C_{12}$, $D_{14}$, $R_{28}$; $C_{13}$, $D_{15}$, $R_{27}$ form the gate circuits $U_1$, $U_2$; O.

The emitter of the transistor $Q_9$ is grounded through a diode $D_{16}$, whereas the collector is connected to the output terminal A. Moreover, the collector of the transistor $Q_9$ is connected through a resistor $R_{26}$ to the $+15V$ supply and through a capacitor $C_{15}$ and a resistor $R_{29}$ in parallel to the base of an npn-junction transistor $Q_8$. The base of transistor $Q_8$ is connected through a resistor $R_{30}$ to the $-15V$ supply, whereas the emitter of this transistor is grounded. The collector of the transistor $Q_8$ is connected through a resistor $R_{24}$ to the $+15V$ supply and through a capacitor $C_{14}$ to the base of the transistor $Q_9$, which base is in turn connected through a resistor $R_{25}$ to the $+15V$ supply.

The pulses that appear in the output A of the monostable multivibrator MF are taken back to the symmetrical inputs of the bistable multivibrator FF. The symmetrical inputs of the bistable multivibrator FF comprise a capacitor $C_9$ respectively $C_{10}$ connected in series each with a diode $D_9$ respectively $D_{10}$ to the base of an npn-junction transistor $Q_6$ respectively $Q_7$. Resistors $R_{17}$, $R_{18}$ are provided between the junctions of capacitor $C_9$ and diode $D_9$ respectively capacitor $C_{10}$ and diode $D_{10}$ and the collectors of the transistors $Q_6$ respectively $Q_7$. The emitters of the transistors $Q_6$, $Q_7$ are grounded, whereas their collectors are each connected through a resistor $R_{14}$ respectively $R_{15}$ to the $+15V$ supply. The base of transistor $Q_6$ is connected, on the one hand, through a resistor $R_{20}$ shunted by a capacitor $C_{11}$ to the collector of the transistor $Q_7$ and, on the other hand, through a resistor $R_{21}$ to the −15V supply. Analogously the base of the transistor $Q_7$ is connected, on the one hand, through a resistor $R_{19}$ shunted by a capacitor $C_7$ to the collector of the transistor $Q_6$ and, on the other hand, through a resistor $R_{22}$ to the −15V supply. The base of the transistor $Q_7$ is further connected through a diode $D_{11}$ and a resistor $R_{23}$ to a terminal U to which a positive trigger pulse can be applied. The base of transistor $Q_6$ is further connected through a diode $D_8$ and a capacitor $C_8$ to a terminal BH to which an electronegative auxiliary trigger pulse can be applied. The junction between the diode $D_8$ and the capacitor $C_8$ is incidentally connected through a resistor $R_{16}$ to the collector of the transistor $Q_6$.

By applying a positive trigger pulse to the terminal U and a negative auxiliary pulse to the point BH the transistor $Q_7$ is rendered conductive and the transistor $Q_6$ non-conductive before a measurement is made in order to make sure that when the measuring system starts the output $G_2$, i.e. the collector of the right-hand transistor $Q_7$ delivers an "L" signal (about OV).

Otherwise the bistable multivibrator FF and the monostable multivibrator MF have the well known property of changing state when a pulse appears in their inputs. Whereas in the case of the bistable multivibrator FF the changed state remains until a fresh pulse appears in the input, this is not so in the case of the monostable multivibrator in which this state is only quasi-stable, meaning that at the end of a time constant T characteristic of the circuit the old state is spontaneously restored.

Overall the compensating network in FIG. 4 functions as follows:

The uncorrected signal pulses are applied to terminal D and reach the base of the common emitter operated transistor $Q_1$. The transistor $Q_1$ rotates the phase of the input signal 180° so that the input signals appear inverted at the collector. The inverted pulses in the output of the phase inverting stage are applied to the base of the conducting transistor $Q_4$ of the modified monostable multivibrator MMF, causing the latter to change to its quasi-stable state. The time $\tau$ the quasi-stable state is maintained depends, as already explained, upon the magnitude of the temperature-dependent compensating voltage $U_K$. At the end of this time interval $\tau$ the modified monostable multivibrator MMF returns to its stable state in which the right-hand transistor $Q_4$ conducts. The collector of this transistor is therefore roughly at OV, representing the digital "L" signal. This "L"-signal appears unchanged in the output B since the interposed common emitter operated transistor $Q_5$ does not change the phase of the signal. As already mentioned, a restoring pulse or an auxiliary pulse is applied to ensure that the right-hand transistor $Q_7$ of the bistable multivibrator FF is in the conducting state. Consequently the right-hand output $G_2$ of the bistable multivibrator FF will likewise provide an "L" signal (OV) and thereby prepare the gate circuit $C_{12}$, $R_{28}$, $D_{14}$ to ensure that the "O"–"L" flank of the pulse which appears at the end of the time interval in the output B of the modified monostable multivibrator MMF will after differentiation reach the base of the transistor $Q_9$ of the monostable multivibrator. The monostable multivibrator MF will then assume its quasi-stable state for the period T during which the right-hand transistor $Q_9$ blocks and the left-hand transistor $Q_8$ conducts. At the end of the time T the monostable multivibrator MF returns to its stable state. The negative trailing flank "O"–"L" of the pulse then appearing in output A is taken to the symmetrical input of the bistable multivibrator FF and causes this multivibrator th change into the state in which the left-hand transistor $Q_6$ conducts and the right-hand transistor $Q_7$ blocks. Hence the left-hand output $G_1$ of the bistable multivibrator FF provides the "L" signal (OV), causing the other gate circuit $C_{13}$, $R_{27}$, $D_{15}$ in the input circuit of the monostable multivibrator MF to be so prepared that the next "L" signal appearing at point E and applied to the gate circuit will again change the monostable multivibrator MF into its quasi-stable state from which it returns to its stable state at the end of the time T.

The time interval $t_m$ that elapses between the appearance of the two consecutive pulses in the output A of the monostable multivibrator MF is therefore the measured time reduced according to the temperature-dependent elongation of the distance over which the projectile has been timed.

A further compensation for temperature-dependent changes in the length of the measuring distance can be accomplished by mechanical means in the manner conventional in the making of clocks to compensate changes in pendulum lengths, namely by replacing each of the rods S upon which the coils of the pick-off system are mounted by a system of rods so disposed that the distance between the ends of the system is much less affected by temperature.

I claim:

1. Apparatus for measuring the muzzle velocity of a projectile comprising a gun barrel, a measuring system at the muzzle of said gun barrel having two relatively spaced coils through which the projectile passes for inducing two signal pulses, bars on which said coils are mounted, said bars changing their length with a variation of temperature, means for measuring the time interval between said induced signal pulses, a temperature sensing element on said measuring system and means utilizing the output of said sensing element to vary the measured time interval.

2. Apparatus according to claim 1 wherein said sensing element comprises a temperature-dependent resistor, a phase-inverting stage, a modified monostable multivibrator, two AND-gates, an OR-gate, a bistable multivibrator and a monostable multivibrator, said signal pulses being applied to said phase-inverting stage and the output of said phase-inverting stage being connected to the input of said modified monostable multivibrator, said temperature-dependent resistor producing a compensating voltage which is applied to said modified monostable multivibrator for varying the time the modified monostable multivibrator remains in its quasi-stable state, the input and the output of said modified monostable multivibrator being each connected to one of the inputs of said AND-gates, the other inputs of said AND-gates being connected to the two outputs of said bistable multivibrator, the outputs of the two AND-gates are taken through said OR-gate to the input of said monostable multivibrator, which delivers the corrected signal pulses in its output and which corrected signal pulses are fed back to the symmetrical inputs of the bistable multivibrator.

3. Apparatus according to claim 2, wherein said modified monostable multivibrator comprises a first and a second transistor, said first transistor being normally in the conductive state, said first transistor having a base connected to a constant current supply and said second transistor being normally non-conducting, said second transistor having the collector applied to the compensating voltage.

4. Apparatus according to claim 2 comprising an operational amplifier, wherein said temperature-dependent resistor is included in the input circuit of said operational amplifier, wherein the feedback circuit of said operational amplifier contains a non-linear relationship existing between the spacing of the coils of the measuring system and the change in temperature, and wherein the output of said operational amplifier is connected to the collector of said second transistor.

* * * * *